United States Patent [19]
Dahlstrom et al.

[11] 3,873,532

[45] Mar. 25, 1975

[54] SULFUR DIOXIDE SCRUBBING PROCESS

[75] Inventors: Donald A. Dahlstrom; Conrad F. Cornell, both of Salt Lake City, Utah

[73] Assignee: Envirotech Corporation, Menlo Park, Calif.

[22] Filed: Apr. 23, 1973

[21] Appl. No.: 353,260

[52] U.S. Cl. ............................... 423/242, 423/166
[51] Int. Cl. ............................................ C01b 17/00
[58] Field of Search ........................... 423/242–244, 423/165, 166, 512

[56]  References Cited
UNITED STATES PATENTS

| | | | |
|---|---|---|---|
| 1,399,845 | 12/1921 | Bull | 159/47 |
| 2,626,853 | 1/1953 | Armstrong | 423/165 |
| 3,360,399 | 12/1967 | Knox et al. | 423/165 |
| 3,420,775 | 1/1969 | Cadwallader | 423/165 |
| 3,607,033 | 9/1971 | Shah | 423/165 |
| 3,775,532 | 11/1973 | Shah | 423/242 |

*Primary Examiner*—Oscar R. Vertiz
*Assistant Examiner*—Gregory A. Heller
*Attorney, Agent, or Firm*—Robert E. Krebs; Thomas S. MacDonald

[57]  ABSTRACT

Sulfur dioxide is scrubbed from stack gases in an absorption device by a sodium-based aqueous scrubbing solution, a portion of which is subsequently and continuously regenerated outside the absorption apparatus by a causticizing reaction with slaked lime. The causticized solution is routed through a settling device wherefrom a portion of the aqueous sediment is returned to the causticizing zone to provide seed crystals which encourage the formation of larger sized solid particles; also, a portion of the aqueous sediment from the settling device is continuously mechanically dewatered and then removed from the system. The liquid effluent solution from the settling device is passed to a solids-contacting and reaction device for mixing with sodium carbonate in order to reduce the calcium ion concentration and the solids content of the solution. The underflow of the solids-contacting device is conveyed back to the causticizing zone and the clarified overflow, i.e., the regenerated scrubbing liquor, is conveyed to the absorption apparatus.

23 Claims, 1 Drawing Figure

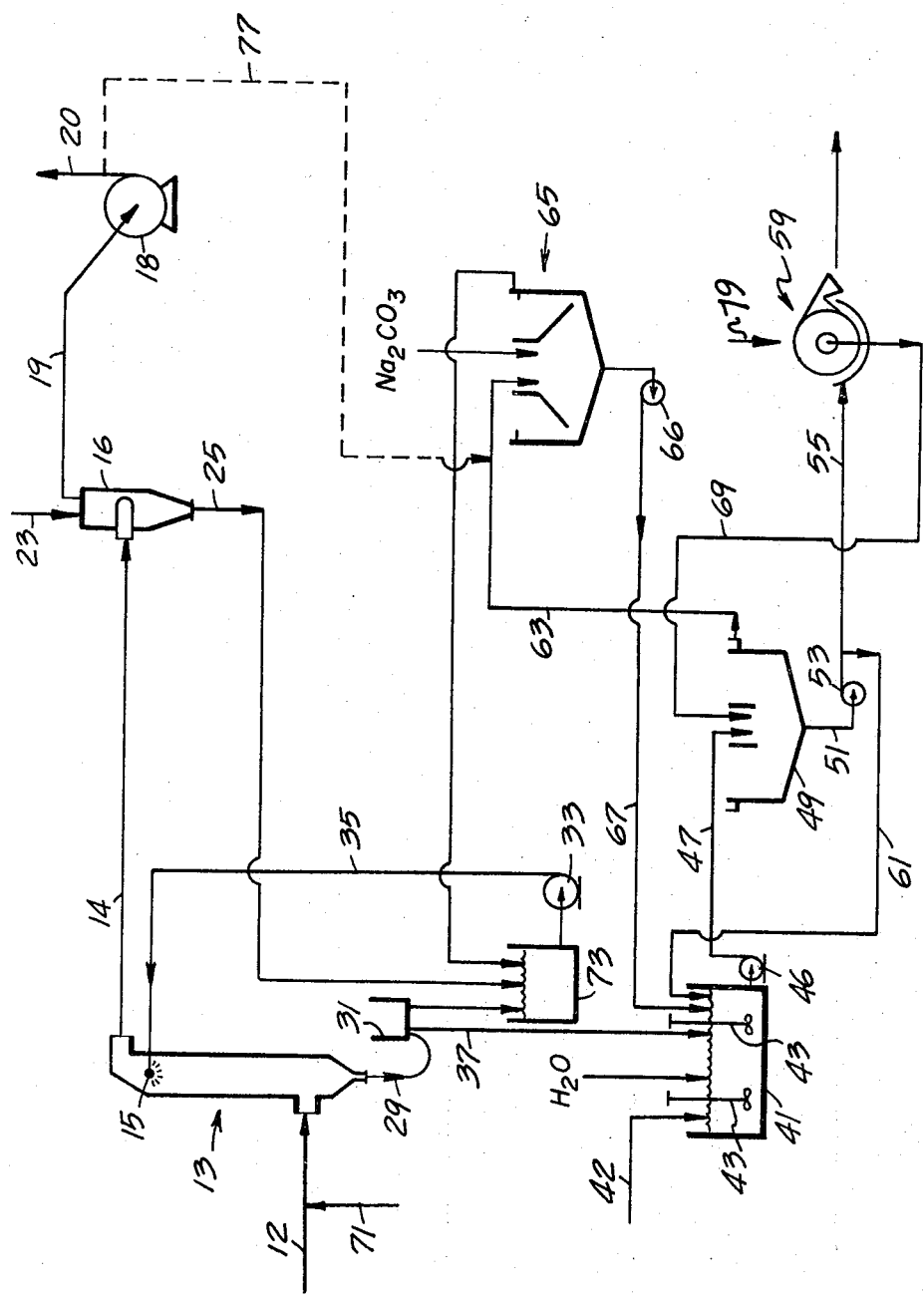

SULFUR DIOXIDE SCRUBBING PROCESS

BACKGROUND OF THE INVENTION

1. Field of the Invention:

This invention generally relates to a system for removing sulfur dioxide from flue gases by scrubbing with an alkaline liquid and, more particularly, this invention relates to a sulfur dioxide scrubbing system wherein the absorbant liquid is a sodium-based solution which is continuously regenerated outside the scrubbing apparatus by treatment with a calcium compound, such as lime or slaked lime.

2. State of the Art:

Sulfur dioxide is a gas which is created by the oxidation of sulfur-bearing materials such as coals, oil, and natural gas. While it has long been deemed desirable to limit the concentration of sulfur dioxide in combustion gases which are released to the atmosphere, no completely commercially-satisfactory, dependable sulfur dioxide removal system has yet been devised. Sulfur dioxide emission is a particularly acute problem in the electric power generating industry where large quantities of coal are burned.

It is well know that sodium-based scrubbing solutions, such as sodium hydroxide in water, have a great affinity for sulfur dioxide. Since such solutions are relatively expensive, attempts have been made to regenerate the sodium-based scrubbing liquors by reacting, or causticizing, the spent scrubbing solutions with an alkaline earth compound, such as lime or limestone. Such a regenerating process is taught, for example, in U.S. Pat. No. 1,271,899 to Howard wherein a dilute solution of sodium sulfite leaving a scrubbing apparatus is reacted with lime to produce calcium sulfite as a precipitate and to regenerate the sodium hydroxide scrubbing liquor.

In practice, such regenerative sulfur dioxide treatment processes have not operated satisfactorily. One problem has been the presence of calcium ions in the regenerated scrubbing solution; those ions tend to produce insoluble deposits, which are called "scale" and which consist essentially of calcium sulfate (gypsum) plus some amounts of calcium sulfite, which foul the scrubbing apparatus and plug the associated piping. One reason the calcium ions are present in the regenerated scrubbing solution is because the recausticizing reaction produces, inter alia, calcium sulfate, an ionic compound which is relatively highly soluble.

Some art workers in such regenerative processes have attempted to reduce the calcium ion concentration by trying to avoid the formation of calcium sulfate. To do that, those workers have attempted to minimize the degree of oxidation of the scrubbing liquid in the scrubbing apparatus or in the lines leading from the apparatus, to thereby minimize the formation of sodium sulfate in favor of sodium sulfite formation. Other art workers have accepted that calcium sulfate is formed during the regenerative process and have then attempted to remove the calcium sulfate prior to re-using the recausticized scrubbing liquor. These latter workers have used a combination of steps to accomplish the calcium sulfate removal; first, they have maintained an excess of sodium sulfate in the regenerating reaction zone to encourage the precipitative removal of calcium sulfate and, subsequently, they have treated the causticized scrubbing solution with large amounts of sodium carbonate, thereby to eliminate most of the remaining calcium cations in the form of a precipitate, calcium carbonate. In practice, however, the techniques of the latter art workers have loaded the entire scrubbing systems with sodium ions which not only is uneconomical but requires an excessive purge to maintain chemical control.

SUMMARY OF INVENTION

The present invention provides a dependable system for removing sulfur oxides and, particularly, sulfur dioxide from combustion and process gases by wet scrubbing where the scrubbing liquid is an aqueous alkali-based solution, such as aqueous sodium hydroxide or sodium carbonate, which is continuously regenerated outside the scrubber by means of a reaction with an alkaline material, such as lime or a hydrate thereof. Generally, the present invention provides ways and means which effectively reduce the calcium ion concentration and the suspended solids content of the regenerated scrubbing liquor thereby to prevent scaling in the scrubbing apparatus and, also, to provide a readily filtered product for disposal. Said ways and means comprise providing settling means following the recausticizing of the scrubbing liquor for settling solids from the recausticized liquor and then recycling a fraction of the settled solids to provide seed crystals thereby to promote the desupersaturation of the recausticized liquor or control the supersaturation of the process liquor by the precipitative removal of the calcium reaction products (e.g., calcium sulfite and sulfate) and, concomitantly, to provide relatively larger size solid particles, principally gypsum crystals, for subsequent filtration and disposal. The system further preferably includes a solidscontacting and reaction device wherein the liquid effluent overflow from the settling device is received and reacted with sodium carbonate and then settled, thereby to reduce the concentration of calcium ions in the clarified and regenerated scrubbing liquid; the underflow stream from the solids-contacting device is recycled to contact the slurry in the recausticizing device thereby to provide a further reactant.

In one specific modification, the system also includes means for quenching the stack gases with an aqueous solution prior to scrubbing. In another specific modification, means are provided to supplement the causticizing reaction with additional oxygen thereby to particularly oxidize sulfites to sulfates.

BRIEF DESCRIPTION OF THE DRAWINGS

The present invention may be more readily understood and carried into effect by reference to the following description and appended drawings, which are offered by ways of illustration and not limitation to the invention, the scope of which is defined by the appended claims and equivalents thereof rather than by any preceding description. In the drawings, FIG. 1 is a schematic diagram of a system according to the invention.

DETAILED DESCRIPTION OF THE PREFERRED EMBODIMENT

In the system illustrated in FIG. 1, sulfur dioxide bearing gases are introduced through line 12 into a wet scrubber 13 for cleaning. Prior to entering the scrubber, the gases can be routed through a mechanical collector, an electrostatic precipitator, or other mechanism for removing entrained particulates from the gas stream; however, the illustrated system can operate adequately in the absence of a prior particulate removal device. The scrubber can be of any one of several well-known types of absorption apparatuses; the illustrated one is conventional and is known as a low-energy packed-bed type; it functions to remove particulate matter, principally fly ash, from the incoming gas stream, as well as to absorb the sulfur dioxide therefrom. The incoming gas stream is introduced near the base of the scrubber and flows upward against a counter-current flow of scrubbing liquid to exhaust through a duct 14 near the top of the scrubber. The scrubbing liquid is emitted from conventional spray nozzles 15 or the like in the scrubber and serves to absorb or strip the sulfur dioxide from the entering gas stream. Residual liquid droplets in the scrubbed gas can be conventionally removed either in the scrubber or, preferably, externally in a mist-eliminating device such as the illustrated inertial cyclone collector 16 which is connected to the duct 14. The substantially dried and cleaned gases are released from the mist-eliminating device 16 to the atmosphere via a conventional draft-inducing fan 18 which is connected to the misteliminating device by a duct 19. The mist eliminator has an outlet 25 and liquid is recycled therethrough to the scrubbing liquor supply as will be later explained in greater detail. In the illustrated preferred arrangement, the mist eliminator 16 can be washed periodically with fresh water introduced thereto via line 23 and drained therefrom via line 25. That drainage can be returned for admixture to the scrubbing liquor stream mentioned above.

The reaction in the scrubber is principally in accordance with the first equation below, whereby the scrubbing liquor (hydrated sodium hydroxide, NaOH) reacts with the sulfur dioxide gas to form sodium sulfite, a highly soluble salt, plus water. Also, some of the sodium sulfite is oxidized in the scrubber to form soluble sodium sulfate in accordance with the second equation (2) below. As will be explained later herein, this latter reaction is encouraged in the present system, in contrast to prior art systems which sought to produce calcium sulfites but not sulfates.

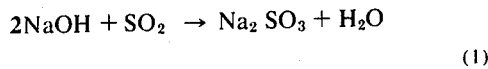

$$2NaOH + SO_2 \rightarrow Na_2SO_3 + H_2O \quad (1)$$

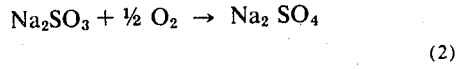

$$Na_2SO_3 + \tfrac{1}{2} O_2 \rightarrow Na_2SO_4 \quad (2)$$

The liquid effluent from the scrubber 13, i.e., the partially spent scrubbing liquid, is drained via line 29 and then is split into two streams by means, for example, of a splitter box 31. The major stream leaving the splitter box is continuously returned, via a sump pump 33 interposed in line 35, to the scrubber spray nozzles 15 and the minor stream flows via line 37 to a reaction vessel 41 wherein the partially spent scrubbing liquor is causticized and, thereby, regenerated. The minor stream may comprise, for example, 10 percent of the total flow, although this can vary considerably. The actual quantity of scrubbing liquid flow is primarily dependent upon the volume of gas introduced to the scrubber, the desired degree of sulfur dioxide removal, and the characteristics of the particular scrubber used in practice.

The reaction device 41 is a conventional piece of equipment wherein a calcium compound, preferably slaked lime (calcium hydroxide) is introduced as indicated by line 42. The calcium compound is mechanically mixed in the reaction device with the partially-spent scrubbing liquid, as by mixer 43, to chemically react therewith, principally in accordance with the following two equations (3) and (4). The quantity of lime added is approximately equal to the stoichiometric amount of sulfur dioxide removed in the scrubber.

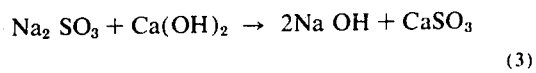

$$Na_2SO_3 + Ca(OH)_2 \rightarrow 2NaOH + CaSO_3 \quad (3)$$

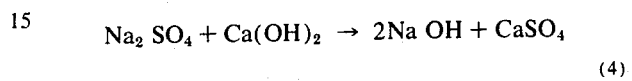

$$Na_2SO_4 + Ca(OH)_2 \rightarrow 2NaOH + CaSO_4 \quad (4)$$

The theoretical effect of the above-stated reactions 3 and 4 is to precipitate out the sulfite and sulfate ions as calcium sulfite and calcium sulfate, respectively. In practice, much of the calcium sulfite and sulfate precipitate remains physically suspended in the liquid phase of the recausticized stream. In the illustration system, the recausticized stream is conveyed via pump 46 and line 47 from the reaction vessel 41 to a conventional settling device 49 wherein the liquid is held in a generally quiescent state so that the suspended solids settle. Then, the sediment is raked to an underflow discharge connection 51 whence a portion of it is continuously pumped via pump 53 and line 55 to a filtration device, such as the schematically-illustrated rotary drum vacuum filter 59 or a centrifuge for further dewatering. The amount of solids pumped to the filtration device equals the amount of particulate matter and equivalent $SO_2$ removed in the scrubber. The dewatered solids, or filter cake, produced by the filtration device, comprise mainly gypsum ($CaSO_4 \cdot 2H_2O$) and fly ash; this filter cake is substantially non-polluting and can be discarded or perhaps used as raw materials in some product such as wallboard.

According to the invention, a fraction of the settling device underflow is continuously recycled to mix with the recausticized stream via a line 61 which splits from line 55. The mixture with the recausticized stream may occur in the reaction device 41 or in other locations. The recycled flow is controlled according to a predetermined solids concentration level. The presence of the returned solids and, particularly, the presence of the crystals of calcium sulfate causes a nucleation or crystal growth phenomenon in the reaction vessel whereby the returned solids enhance the removal of calcium sulfite and sulfate from the reacted liquid. That is, the returned solids act as mother crystals or seed in the liquid in the reaction vessel and further formation of calcium sulfite or sulfate crystals takes place on those seeds; the result is a relatively complete removal of the suspended calcium sulfite and sulfate solids and the formation of larger solid particles. Furthermore, the seed crystals encourage the precipitative removal or desupersaturation of the relatively soluble calcium sulfate. It has been found that without the returned solids (i.e., when the suspended solids concentration is maintained at a lower level), the recausticized stream tends to be supersaturated with calcium sulfate.

Accordingly, the formation of calcium sulfate (or its progenitor, sodium sulfate) is not discouraged in the present system. In fact, the nucleation mechanism is so effective that sulfate formation is encouraged in the present system (at the expense of sulfite formation) and, particularly, this is done because the calcium sulfate particles are better suited for subsequent dewatering. Also, the sulfite precipitate tends to "plate out" on the sulfate particles and thusly is readily removed. Those large-sized particles, formed from the recycle of the seed crystals, allow washing and dewatering of the underflow from the settling device to be accomplished on a reasonably sized, commercially available apparatus such as the rotary drum vacuum filter 59. The ability to wash the large-sized crystals is important so that contaminants can be removed which might otherwise cause a water pollution problem.

Although the liquid overflow from the settling device 49 is fairly physically clear, it is nevertheless chemically saturated with calcium ions. In the illustrated system, that overflow is conveyed via line 63 to a solids-contacting unit 65, wherein the concentration of calcium ions in the liquid is reduced. A solids-contacting unit is usually a concentric compartment device, such as the ReactorClarifier unit, manufactured by EIMCO Division of Envirotech Corporation. In such a device, mixing and chemical reactions occur in the central compartment while settling takes place in the outer compartment, and means are provided to effect circulation of reacted material between the two compartments. In the solids-contact unit of the illustrated system, sodium carbonate (soda ash) is selectively added, as indicated, and reacts with the calcium cations in the effluent from the settling device in accordance with the following equation (5):

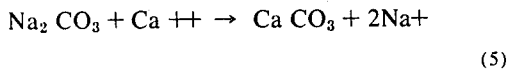

$$Na_2 CO_3 + Ca^{++} \rightarrow Ca CO_3 + 2Na^+ \quad (5)$$

The solids-contacting unit is very important to the synergistic operation of the system; as compared with an ordinary mixing tank, the illustrated solids contacting device permits the achievement of a low calcium ion concentration in the liquor which returns to the scrubber by this addition of relatively small amounts of sodium carbonate (soda ash). The amount of sodium carbonate is controlled to ensure that a set sodium concentration always exists in the liquor stream and the system avoids building up and overloading itself with sodium ions. Furthermore, the settling zone in the solids-contacting unit essentially eliminates the presence of suspended solids, particularly calcium sulfite and sulfate crystals, in the solids-contacting unit overflow which is returned as scrubbing liquor to the scrubber. Accordingly, suspended solids do not circulate throughout the entire flowsheet but only within the portion of the system between the causticizer and the solidscontacting device. In the practice of the illustrated system, the underflow liquor from the settling device contains approximately 15–20 percent suspended solids.

As stated by equation (5) above, the reaction in the solidscontacting unit yields insoluble calcium carbonate and sodium ions in solution. The sodium ions are beneficially used in the scrubbing apparatus. The low solids-containing aqueous underflow of settled solids from the solids-contacting unit 65 is conveyed, via a conventional pump 66 and line 67, back to the causticizer 41. Returning the underflow slurry to the causticizer achieves a more complete reaction and, also, the solids in the underflow collide with the suspended precipitate particles, thereby enlarging the size of those particles such that rapid settling occurs and a relatively clear overflow ensues. Moreover, in the solids-contacting unit, some absorption of the calcium ions onto the recycled solids occurs and that absorption aids in reducing the dissolved calcium ion concentration.

In the case of the filtering device 59, the filtrate is returned to the settling device 49 by way of line 69 for the purpose of reclaiming the sodium values which are washed from the solids during filtration and to insure that solids in the filtrate will be removed prior to sending the liquor to the scrubber. The clarified overflow from the solids-contacting unit is conveyed to a tank, or sump 73, where it comingles with the recycled fraction of the scrubbing liquor for further use in the scrubber. Alternatively, the aforementioned overflow stream can be routed directly to the scrubbing device 13. It may now be appreciated that the present system precludes the deleterious accumulation of solids, especially in the scrubber, and accordingly the system is highly reliable relative to prior systems.

The gas stream entering the scrubbing apparatus can be first subjected to a quench by an aqueous spray, indicated by line 71, thereby to lower the temperature of the gases from 350°–110°C to about 50°C. The aqueous spray can use fresh water or even the scrubbing solution itself. At that temperature calcium sulfate is the most soluble and, therefore, scaling in the scrubbing apparatus is further inhibited. Quenching the incoming gases also aids in avoiding scaling in the lower portions of the scrubber. Where there is no provision for quenching outside the scrubbing apparatus, then there occurs localized evaporation in the scrubber which, in turn, can cause supersaturation of the scrubbing solution and precipitation at that location. With a prequench, the evaporative problem is resolved and precipitation occurs in the reaction tank, as intended.

Makeup liquid can, of course, be added to the system in other ways. In the illustrated system, for example, washing liquid is supplied via line 79 to wash the filter cake on the rotary filter 59 and to aid in making up for liquid losses. In one particularly advantageous embodiment, the wash liquid is cooling-tower "blow-down" liquid. Cooling towers, for use in cooling heated waters prior to stream discharge, generally include a packed bed which is continuously of periodically blown-down in order to control the buildup of dissolved salts therein. Disposal of the blow-down liquid often presents a pollution problem. In the illustrated system, such blow-down liquid serves as the wash liquid for the filter cake on the filter 59. The dissolved salts in the blow-down liquid are concomitantly retained within the filter cake, thereby resolving the pollution problem. The blow-down liquid can be introduced at other points in the system while still achieving the same final effect. For example, the blown-down liquid can be first introduced into the recausticizing reaction zone; in that case, the salts in the blow-down liquid will still be ultimately collected in the filter cake.

In one modification, additional air or other oxygen-bearing material is intentionally introduced into the regenerative system, preferably in the causticizing tank or in the liquor discharging from the scrubber, to oxidize more of the sulfites to sulfates. As previously mentioned, one reason this is done is because the sulfate precipitates (i.e., gypsum) are easier to filter or centrifuge than are the sulfite precipitates.

The dashed line 77 indicates yet another modification of the system whereby a fraction of the exhaust gases in duct 20 are injected into the liquid overflow line 63 from the settling device. The purpose of the injection is to bring the carbon dioxide gas portion of the exhaust gas, present in amounts generally ranging from 11 to 17 percent by volume, into contact with the decanted liquid from the settling device. The effect, dependent upon the amount of exhaust gases diverted, is to lower the dissolved calcium ion concentration of the scrubbing liquor prior to the time it re-enters the scrubber. The carbon dioxide reacts with solvated calcium ions to produce calcium carbonate precipitate. Also, there is a partial conversion of sodium hydroxide to sodium carbonate, the latter which then reacts with the calcium sulfate/sulfite in the illustrated system to reduce the amount of soda ash required. It should be understood that the carbon dioxide can be injected at locations other than the one shown and that the carbon dioxide can be obtained from sources other than the exhaust gases.

Working Example:

A pilot plant was constructed substantially in accordance with the system shown in the drawings and was extensively tested. The flue gases were obtained from a 100MW electric power generator. In various tests, the following materials were burned: low-sulfur coal, 50 percent coal and 50 percent natural gas, and 100% gas. Prior to scrubbing, those flue gases contained 250 - 500 ppm sulfur dioxide. After operations extending over several months on a five-day week and 24-hour day basis, 90 percent or greater removal of sulfur dioxide was consistently achieved. Particulate removal (e.g., fly ash removal) was less than 0.02 gr/SCF at the outlet of the scrubber, with a pressure drop of about 4 inches water in the scrubber.

The scrubber used in the pilot plant was a packed tower unit with a conventional perforated-sphere plastic packing arranged in a single loosely packed bed.

The liquid-to-gas ratio in the pilot plant scrubber was about 20 gallons of liquid per 1000 actual cubic feet gas. About 3-½ hours detention was provided in the settling device, and solids were recycled to provide approximately 10 - 15 percent by weight solids in the reaction vessel. The system operated at a pH range of 5 - 7, and a preferred pH range of 5.5 - 6.5.

In the pilot plant solids-contacting device, about a 5 percent slurry of calcium carbonate was kept in suspension and returned to the settling device. The overflow from the solids-contacting unit contained approximately 200 ppm dissolved calcium, and no scaling occurred in the scrubber or mist eliminator. The washed filter cake from the filtration device contained approximately 0.5 - 1.5 percent sodium by weight.

We claim:

1. A continuous process for removing sulfur dioxide from a sulfur-dioxide bearing gas stream comprising the steps of:
   a. passing the gas stream into and through a scrubbing zone and there scrubbing the gas by contact with an aqueous alkaline hydroxide scrubbing liquid to convert at least part of the sulfur-dioxide content of the stream to alkaline sulfite and sulfate ions in solution in the scrubbing liquid;
   b. introducing a portion of said scrubbing liquid with said alkaline sulfite and sulfate ions into a first zone and there mixing it with solubilized calcium ions in the presence of finely divided calcium sulfite and calcium sulfate crystals to effect a reaction between said alkaline sulfite and sulfate ions and said calcium ions to precipitate additional calcium sulfite and calcium sulfate solids concomitantly with the regeneration of the aqueous scrubbing liquid by the formation of alkaline hydroxide therein;
   c. separating said precipitated calcium sulfite and sulfate solids from said aqueous scrubbing liquid;
   d. returning at least a portion of said separated calcium sulfite and sulfate solids to said first mixing zone;
   e. reducing the calcium ion content of said regenerated scrubbing liquid by introducing said liquid into a second zone and there mixing it with carbonate ions in the presence of calcium carbonate solids to precipitate additional calcium as calcium carbonate; and
   f. separating said aqueous scrubbing liquid from said calcium carbonate and introducing said regenerated liquid into said scrubbing zone to contact the sulfur-dioxide bearing gas stream therein.

2. The process of claim 1 wherein said scrubbing liquid is a sodium-based solution.

3. The process of claim 2 wherein said sodium-based solution is sodium hydroxide.

4. The process according to claim 3 wherein the sodium hydroxide scrubbing solution is formed in said first zone with slaked lime which furnishes said soluble calcium ions.

5. The process according to claim 1 wherein the separation of said precipitated calcium sulfite and calcium sulfate solids is accomplished in a third zone.

6. The process of claim 5 wherein at least a portion of said precipitated calcium carbonate in the second zone is returned for mixing with the aqueous scrubbing liquid effluent in said first zone.

7. The process according to claim 5 wherein said returned portion of said separated calcium sulfite and sulfate solids contains an amount of calcium sulfate sufficient to desupersaturate the spent scrubbing liquid.

8. The process of claim 1 further including the step of contacting the spent scrubbing liquid stream with oxygen-bearing material thereby to oxidize at least a portion of the sulfites to sulfates.

9. The process of claim 2 wherein the gas stream to the scrubbing zone is first quenched with an aqueous solution to about 50°C prior to being scrubbed.

10. The process of claim 1 wherein said soluble calcium ions are furnished by slaked lime which is supplied to said mixing zone.

11. The process of claim 1 including the step of contacting said regenerated aqueous scrubbing liquid with carbon-dioxide to reduce the calcium ion concentration thereof by producing a calcium carbonate precipitate.

12. The process of claim 1 wherein said carbonate ions are furnished by sodium carbonate which is supplied to said second zone.

13. The process of claim 1 including making up for liquid losses in the system by adding cooling tower blow-down liquid containing dissolved calcium sulfate salts and subsequently precipitatively removing at least some of said salts in said second zone.

14. The process of claim 1 including dewatering said separated calcium sulfite and calcium sulfate to form a filter cake and then washing the same with blow-down liquid from a cooling tower, thereby to retain dissolved calcium sulfate salts from said blow-down liquid in said filter cake.

15. The process of claim 1 further including the step of separately introducing an oxygen-bearing material into said scrubbing liquid that contains said alkaline sulfite and sulfate ions to oxidize a portion of the sulfite ions to sulfate ions.

16. The process of claim 15 wherein said oxygen-bearing material is introduced prior to said first mixing zone.

17. A continuous process for removing sulfur dioxide from a sulfur-dioxide bearing gas stream comprising the steps of:
   a. passing the gas stream into and through a scrubbing zone and there scrubbing the gas by contact with an aqueous alkaline hydroxide scrubbing liquid to convert at least part of the sulfur-dioxide content of the stream to alkaline sulfite and sulfate ions in solution in the scrubbing liquid;
   b. separately introducing an oxygen-bearing material into said scrubbing liquid solution that contains said alkaline sulfite and sulfate ions to oxidize a portion of the sulfite ions to sulfate ions;
   c. then in a first zone, mixing at least a portion of the resultant said solution with solubilized calcium ions in the presence of finely divided calcium sulfite and calcium sulfate crystals to effect a reaction between said alkaline sulfite and sulfate ions and said calcium ions to precipitate additional calcium sulfite and calcium sulfate solids concomitantly with the regeneration of the aqueous scrubbing liquid by the formation of alkaline hydroxide therein;
   d. separating said precipitated calcium sulfite and calcium sulfate solids from said aqueous scrubbing liquid;
   e. returning at least a portion of said separated calcium sulfite and sulfate solids to said first mixing zone;
   f. reducing the calcium ion content of said regenerated scrubbing liquid by introducing said liquid into a second zone and there mixing it with carbonate ions in the presence of calcium carbonate solids to precipitate additional calcium as calcium carbonate; and
   g. separating said aqueous scrubbing liquid from said calcium carbonate and introducing said regenerated liquid into said scrubbing zone to contact the sulfurdioxide bearing gas stream therein.

18. The process of claim 17 wherein said scrubbing liquid is sodium hydroxide solution.

19. The process according to claim 18 wherein the sodium hydroxide scrubbing solution is mixed in said first zone with slaked lime which furnishes said soluble calcium ions.

20. The process according to claim 19 wherein said separation of the precipitated calcium sulfite and calcium sulfate solids is accomplished in a third zone.

21. The process of claim 19 wherein at least a portion of the precipitated calcium carbonate in the second zone is returned for mixing with the material in said first zone.

22. The process of claim 17 wherein said carbonate ions in said second zone are furnished by sodium carbonate which is supplied to said second zone.

23. The process of claim 1 wherein said scrubbing liquid introduced to said first zone contains substantial amounts of sulfate and wherein substantial amounts of sulfate are included in said regenerated liquid that is returned to said scrubbing zone.

* * * * *